3,408,209
PROCESS FOR MANUFACTURING RAPIDLY REHYDRATABLE DEHYDRATED FRUITS AND VEGETABLES OF HIGH DENSITY

Roderick K. Eskew, Spring House, and James Cording, Jr., Philadelphia, Pa., assignors to the United States of America as represented by the Secretary of Agriculture
No Drawing. Filed Mar. 8, 1965, Ser. No. 438,131
10 Claims. (Cl. 99—204)

ABSTRACT OF THE DISCLOSURE

A rapidly rehydratable food product of high density is prepared by drying a fruit or vegetable piece to about 20% to 50% moisture, explosion-puffing the piece, and then compressing one dimension of the puffed piece to between about ½ and ⅕ of said dimension before processing it to table form, e.g., drying, freezing, etc.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to the preparation of dehydrated fruit and vegetable products in dense compacted piece form yet capable of rapid reconstitution to a cooked, edible state.

One type of product now on the market, designed for quick reconstitution, consists of freeze dried materials. These are costly to make, friable and expensive to package because of their bulk and fragility. Another form of rapidly reconstitutable fruit and vegetable pieces is that resulting from explosive puffing of partially dehydrated pieces as described in U.S. Patent 3,038,813 and U.S. application Ser. No. 285,156. Although products of these inventions are far superior to conventionally hot air dried comestibles, and in some respects are superior to freeze dried material in that they are less cotly to make and much less friable, they nevertheless are bulky compared with pieces of the same size dried conventionally in hot air. For example, ⅜-inch carrot dice when dried conventionally in hot air have a bulk density of about 26 pounds per cubic foot. But they require 45 minutes boiling to rehydrate and to be soft enough to eat. In contrast pieces cut the same size and prepared according to either of the foregoing pending or issued patents although they require only 5 minutes boiling to reconstitute, have, before reconstitution, a bulk density of about 20 pounds per cubic foot and are hence more costly to package.

We have discovered means for greatly reducing the bulk of explosive puffed products without in any way impairing their rapid rehydratability, appearance, flavor, or nutritive value on reconstitution. In fact their dry bulk may even be reduced below that of conventionally air dried unpuffed material, e.g., to a bulk density of 30 pounds per cubic foot or more. This process comprises compressing the explosive puffed pieces of fruit or vegetable in their slightly moist plastic state after puffing but before final processing to stabilized form, as for example, by further drying or by freezing.

The compression of the explosive puffed pieces has the primary effect of temporarily collapsing the pores created by the puffing step. This effect is evidenced by the fact that the porosity of an explosion puffed dried ⅜-inch carrot dice made without compression is typically .90 ml. of voids per gram whereas when compression is used this is reduced to .40 ml. of voids per gram. Conventionally hot air dried dice of the same size have a porosity of about .15 ml. of voids per gram. Porosities were determined using an air comparison pycnometer and represent all voids in the pieces whether external or internal.

The compression of conventionally hot air dried fruit or vegetable materials to eliminate interstitial voids and thus to reduce their bulk is admittedly a common practice. The novel aspect of our process lies in the discovery that at the moisture content of between about 20 and 50%, typically that at which pieces of fruits or vegetables are discharged from the "gun," they may be individually compressed, even to the extent of closing the porous canals created by puffing, and that they may thereafter be dried as, for example, in hot air to retain this compact form. However, on immersion in boiling water the canals created by explosive puffing reappear, permitting rapid rehydration of the compressed pieces and expansion to their original size and shape. This rehydration or reconstitution takes place just as rapidly as though the pieces had not been compressed. The advantages of a compact product that possesses the other good attributes of a bulky product entail savings in packaging, storage and transportation. Such products are especially adapted to military use.

Obviously, merely compressing the explosive puffed pieces indiscriminately does not achieve the desired result. It is possible through too little compression to achieve no significant advantage or through too high a compression to destroy rapid rehydratability or to permanently deform their shape.

According to the present invention pieces of explosion-puffed fruit and explosion-puffed vegetable are, prior to final processing to stable form, compressed in one dimension to between about ½ and ⅕ of that dimension prior to compression.

Compression can be done by any convenient means. As for example by passing the pieces in one or more stages between closely set rolls. These rolls may or may not be heated and the pieces may be either compressed while still warm from the gun or after cooling or they can be compressed in bulk not merely decreasing interstitial voids but compressing the individual pieces as herein described.

Example 1 illustrates how the process may be carried out in the case of nominally ⅜-inch carrot dice. This example also includes, for purposes of contrast, a comparison between the product of the present invention (Fraction B), the product of similar carrot dice explosion-puffed and dried (Fraction A), and a product of conventional hot air drying.

The examples are for purposes of illustration only and are not to be construed as restrictive to the type of puffing gun or operating conditions employed.

EXAMPLE 1

Carrots of the Red Core Chantenay variety were peeled by immersing them in a lye solution (20% by weight sodium hydroxide) at 160° F. for 2½ minutes and then subjecting them to high-pressure water sprays to remove the lye-loosened skins. The caps and roots and blemishes were trimmed off by hand. The trimmed whole carrots were blanched in steam at atmospheric pressure for 10 minutes to soften them slightly to prevent shattering in the cutting operation to follow. They were then cut into nominal ⅜-inch cubes. The product of the cutter was passed over a vibrating screen with 3/16-inch wide openings. Approximately 13% by weight of the product of the cutter passed through the openings and was processed separately. The 87% by weight larger than the 3/16-inch minimum dimension were dipped 2 minutes in an aqueous solution containing 0.5% sodium bisulfite and 0.5% citric acid. The pieces were blanched 4 minutes in steam at atmospheric pressure to inhibit enzyme activity and then dried in hot air at 200° F. dry bulb temperature to a moisture content of about 25%.

The partially dried pieces were placed in a puffing gun to give them a porous structure permitting their rapid rehydration upon use after final drying. A puffing gun is a cylindrical vessel, rotatable around its long axis, which can be tilted muzzle up for charging, level for heating and muzzle down for exploding or discharging. The gun is fitted with a hinged lid on the muzzle end which hermetically seals the gun during heating and which can be opened instantly for explosive discharge of the contents. The gun is heated externally, while rotating, with a gas flame. Superheated steam is introduced under pressure into the rotating gun at the end opposite the muzzle through a rotary joint.

A charge of carrot pieces of 17½ pounds at 28.7% moisture content prepared as described above was introduced into the gun, the lid was sealed and rotation was started. Heat was applied by the external gas burners until a temperature of 340–350° F. was reached (as measured by a sliding thermocouple) on the outer surface of the gun barrel. The temperature was maintained at 340–350° F. for 1½ minutes with the gas flame and then superheated steam at 35 p.s.i.g. (pounds per square inch gauge) and 500° F. was introduced. Steam was caused to flow through the carrot pieces inside the gun barrel and out through a restricting orifice in the hinged lid until the pressure inside the gun reached 35 p.s.i.g. Flow was further continued (with heat still being applied externally to maintain the outer gun wall at 340–350° F.) for ½ minute after the pressure inside the gun reached 35 p.s.i.g. Then the gas heat was turned off, the gun tilted to the firing or discharge position of 22° below the horizontal, the lid was opened instantly and the superheated steam flow was stopped.

Upon opening of the lid the carrot pieces discharged explosively from the gun into a collecting system. The rapid reduction of pressure from 35 p.s.i.g. (above atmospheric) to atmospheric caused a portion of the water within the pieces to flash into vapor, creating a porous structure within the pieces.

The product of the gun was divided into two fractions, A and B. Fraction A was placed in a tray of a through-circulation hot air drier, loaded to 9.25 pounds per square foot, and air was passed through the material at 156° F. and about 270 feet per minute velocity until a stable moisture content of about 4% was obtained. The time required to reach the desired moisture content was about 90 minutes.

The carrot pieces in Fraction B were compressed between two rollers running at the same speed and in opposite directions, towards each other at the top nip, the clearance between them set a 1/32-inch. The pieces before compression varied in size; their minimum dimension was about ⅛-inch; their maximum dimension about 7/16-inch. Those pieces passing through the rollers with their minimum dimension parallel to the vertical axis of the rollers were thereby compressed to one-fourth of that dimension. Those pieces passing through the rollers with their maximum dimension parallel to the vertical axis of the rollers were thereby compressed to one-fourteenth of that dimension. The compressed pieces thus prepared from Fraction B were dried to 4% moisture at exactly the same conditions of tray loading, air temperature and air velocity as was Fraction A.

The dried products of Fraction A and B were compared for apparent (bulk) density. That of Fraction A was about 19 pounds per cubic foot that of Fraction B was 27 pounds per cubic foot. The reciprocal of these values represents the packaging volume requirements for each product, i.e., 0.0525 cubic foot per pound of Fraction A against 0.0370 cubic foot per pound of Fraction B; Fraction B requiring only about 70% of the volume required for Fraction A.

The dried products were compared for rehydratability by placing samples of each in simmering water for 5 minutes. At the end of that time each sample had fully rehydrated, the weight of each rehydrated product being five times that of its dry weight. Both had equally regained the generally cubical shape of the carrot pieces entering the first drying step and both were equally soft, cooked, and edible.

Products of Fractions A and B were compared with conventionally hot air dried carrot pieces of the same size, i.e., carrot pieces dried in hot air from their fresh moisture content of about 89% down to a stable moisture content of about 4% without specific treatment to impart a porous structure. This product had an apparent (bulk) density of about 26 pounds per cubic foot, requiring a package volume of about 0.0385 cubic foot per pound. After simmering this product for 5 minutes, it was still tough and inedible, was not rehydrated, and its weight after simmering was only three times that of its dry weight.

The above example shows that Fraction B, having been compressed after puffing, retained the rapid rehydration qualities of Fraction A which was puffed but not compressed. At the same time the apparent density of Fraction B was increased greatly over that of Fraction A and equal to or slightly greater than that of conventionally dried carrot pieces of the same size.

The following example shows how the process may be advantageously applied to fruits as exemplified by apples.

EXAMPLE 2

Apples were peeled, cored, trimmed to remove blemishes and "scald" and were cut along the axis of the core to segments or pie slices, 12 per apple. The segments were submerged in a solution of sodium bisulfite (1% by weight in water) for 5 minutes while the solution was circulated. They were removed and allowed to drain and were then dried to 24% moisture content by passing air at 180° F. dry bulb temperature through them in the tray of a cabinet drier.

The partially dried slices were then explosion-puffed in a manner similar to that described for carrots in Example 1, except a small gun employing external heat only was used. The slices were placed in the gun, the lid closed and rotation started. A gas flame was applied to the outer wall of the gun, heating the contents by conduction only. No steam was introduced into the charge. Heat was applied continuously with the gas flame until the pressure within the gun had gradually increased to 25 p.s.i.g. by virtue of a small amount of the contained water in the pieces being vaporized to steam.

The gun was then tilted to an angle of about 22% below the horizontal and the lid was instantly opened. The apple segments were discharged explosively by the sudden release of pressure and were puffed and made porous by the instant vaporization of part of their contained water. The product from the gun was divided into two fractions, A and B. Fraction A was placed in a tray drier and dried to about 2% moisture content by passing air at 150° F. dry bulb temperature through it. The apple pieces of Fraction B were compressed by passing them between rollers set at 1/16-inch clearance, the long axis of the pieces passing through being parallel to the vertical axis of the rollers. Since a cross-section of each piece taken by cutting through at right angles to its long axis resembles a segment of a circle, wedge-shaped, the outer edge was subjected to a greater compression than the inner edge, which for practical purposes has no thickness. Measurement of the outer edge of cross-sections taken from 12 pieces discharged from the gun showed the largest dimension (outer edge of the segment prepared as described above) to be between 7/16-inch and ¾-inch. These dimensions were respectively reduced to ⅐ and 1/12 of their original value by compression to 1/16-inch between the rollers. After compression, Fraction B was dried to 2% moisture in the same manner as Fraction A.

The dehydrated pieces from Fraction A and Fraction B were rehydrated separately by simmering in water for 5 minutes. At the end of that time each fraction had absorbed approximately the same amount of water, had returned to the shape and size of the original raw apple pieces, and was soft and adequately cooked to be eaten as a compote or used in pies.

The bulk density of each fraction was measured. That of Fraction A was 16 pounds per cubic foot; that of Fraction B was 20½ pounds per cubic foot. Pieces cut the same size and shape and dried without puffing or squeezing had a bulk density of 16 pounds per cubic foot.

The reduction in bulk density achieved in Example 2 by compacting the individual segments was not as great as in Example 1 because the shape and relatively large size of the segments created large interstitial voids. A greater increase in bulk density could be course be had on pressing if the individual pieces were smaller.

We claim:

1. In a process for preparing rapidly rehydratable, explosion-puffed pieces of fruits and vegetables, a step intermediate the explosion-puffing step and the subsequent step of processing to stable form by either freezing or drying, comprising compressing one dimension of a member selected from the group consisting of explosion-puffed fruit pieces and explosion-puffed vegetable pieces to between about ½ and 1/15 of said dimension.

2. The process of claim 1 in which processing to stable form comprises drying.

3. The process of claim 1 in which processing to stable form comprises freezing.

4. The process of claim 2 in which the fruit is apple.

5. The process of claim 2 in which the vegetable is carrot.

6. A process for preparing a rapidly rehydratable food product of high density comprising drying a member of the group consisting of fruit and vegetable pieces to a moisture content between about 20 and 50%, heating said member at pressures between about 60 and 20 p.s.i.g., instantly releasing the pressure to that of the atmosphere thus creating a partially dehydrated member having porous structure, compressing one dimension of the member having porous structure to between about ½ to 1/15 of said dimension prior to compression, and processing the compressed member to stable form by either freezing or drying.

7. The process of claim 6 in which processing to stable form comprises drying.

8. The process of claim 6 in which processing to stable form comprises freezing.

9. The process of claim 7 in which the member is a piece of apple.

10. The process of claim 7 in which the member is a piece of carrot.

References Cited

UNITED STATES PATENTS

| | | | |
|---|---|---|---|
| 3,295,995 | 1/1967 | Bright et al. | 99—204 |
| 3,284,209 | 11/1966 | Kelly | 99—2 |
| 3,038,813 | 6/1962 | Cording et al. | 99—204 |
| 2,718,470 | 9/1955 | Kaufman et al. | 99—204 |

FOREIGN PATENTS 218,614    11/1958    Australia.

A. LOUIS MONACELL, *Primary Examiner.*

S. B. DAVIS, *Assistant Examiner.*